US007259536B1

(12) United States Patent
Ketner

(10) Patent No.: US 7,259,536 B1
(45) Date of Patent: Aug. 21, 2007

(54) SOLAR POWERED MOBILE

(76) Inventor: Cheryl L. Ketner, 3313 Perlita Ave., Los Angeles, CA (US) 90039

( * ) Notice: Subject to any disclaimer, the term of this patent is extended or adjusted under 35 U.S.C. 154(b) by 219 days.

(21) Appl. No.: 11/154,338

(22) Filed: Jun. 17, 2005

(51) Int. Cl.
*B60K 16/00* (2006.01)

(52) U.S. Cl. ......................... 320/101; 74/10.8; 74/362; 74/366; 40/473; 40/493; 40/617

(58) Field of Classification Search ................ 320/101, 320/136; 323/906; 136/291; 74/10.8, 362, 74/366; 180/2.2; 40/473, 493, 617
See application file for complete search history.

(56) References Cited

U.S. PATENT DOCUMENTS

| | | | | |
|---|---|---|---|---|
| 4,331,042 | A * | 5/1982 | Anderson | 74/572.1 |
| 4,376,347 | A | 3/1983 | Thompson | |
| 4,441,143 | A * | 4/1984 | Richardson, Jr. | 362/183 |
| 4,543,623 | A * | 9/1985 | Ehret | 362/267 |
| 4,626,852 | A * | 12/1986 | Dodge | 340/985 |
| 5,262,756 | A * | 11/1993 | Chien | 340/332 |
| 5,877,418 | A * | 3/1999 | Weihe | 73/379.02 |
| 5,905,356 | A * | 5/1999 | Wells | 320/101 |
| 6,101,750 | A * | 8/2000 | Blesener et al. | 40/448 |
| 6,263,674 | B1 * | 7/2001 | Fileman et al. | 60/641.9 |
| 2004/0035459 | A1 * | 2/2004 | Reed | 136/244 |
| 2004/0182613 | A1 * | 9/2004 | Lin | 180/2.2 |

* cited by examiner

*Primary Examiner*—Karl Easthom
*Assistant Examiner*—M'baye Diao

(57) ABSTRACT

A solar powered mobile, comprising a drive housing fitting within a case, a solar cell panel fitted within the top of the drive housing, a clear cover over the solar cell panel, a removable DC motor with speed control driven by the solar cell panel, gears connecting the motor to a bearing which provides fastening of a spinner or other device for display.

6 Claims, 5 Drawing Sheets

SOLAR POWERED MOBILE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

A solar powered mobile is desirable not only for application in areas of little air movement but also for longevity. A desirable solar powered mobile should be direct in design and offer easy parts replacement. A desirable solar powered mobile should offer bearing design that provides freedom in choosing devices to be spun, such that even heavier devices can be displayed. The present invention offers these and other advantages.

FIELD OF THE INVENTION

The invention relates to animated display devices and more specifically to a solar light powered mobile.

SUMMARY OF THE INVENTION

The general purpose of the solar powered mobile, described subsequently in greater detail, is to provide a solar powered mobile which has many novel features that result in an improved solar powered mobile which is not anticipated, rendered obvious, suggested, or even implied by prior art, either alone or in combination thereof.

To accomplish this, the solar powered mobile comprises a triangulated upper attachment removably attached to three mounting ears of the case of the invention. A drive housing is fitted within the case. A solar cell panel is fitted within the top of the drive housing. A clear cover is fitted over the solar cell panel. A removable DC motor with speed control is driven by the solar cell panel. A pinion gear driven by the motor drives the drive gear fixed with a bearing. The bearing provides for fastening a spinner or other device for display. With solar power, wind is not needed to drive the invention. The invention can thereby be displayed in areas that do not experience wind or even areas that do. The invention is basic and direct. The invention's design provides for replacement of any part of the invention, such that prolonged use is not a concern.

Thus has been broadly outlined the more important features of the solar powered mobile so that the detailed description thereof that follows may be better understood and in order that the present contribution to the art may be better appreciated.

Numerous objects, features and advantages of the solar powered mobile will be readily apparent to those of ordinary skill in the art upon reading the following detailed description of presently preferred, but nonetheless illustrative, examples of the solar powered mobile when taken in conjunction with the accompanying drawings. In this respect, before explaining the current examples of the solar powered mobile in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the solar powered mobile. It is therefore important that the claims be regarded as including such equivalent constructions insofar as they do not depart from the spirit and scope of the present invention.

Objects of the solar powered mobile, along with various novel features that characterize the invention are particularly pointed out in the claims forming a part of this disclosure. For better understanding of the solar powered mobile, its operating advantages and specific objects attained by its uses, refer to the accompanying drawings and description.

DETAILED DESCRIPTION OF THE DRAWINGS

With reference now to the drawings, and in particular FIGS. 1 through 5 thereof, example of the solar powered mobile employing the principles and concepts of the present invention and generally designated by the reference number 10 will be described.

Figure 5:
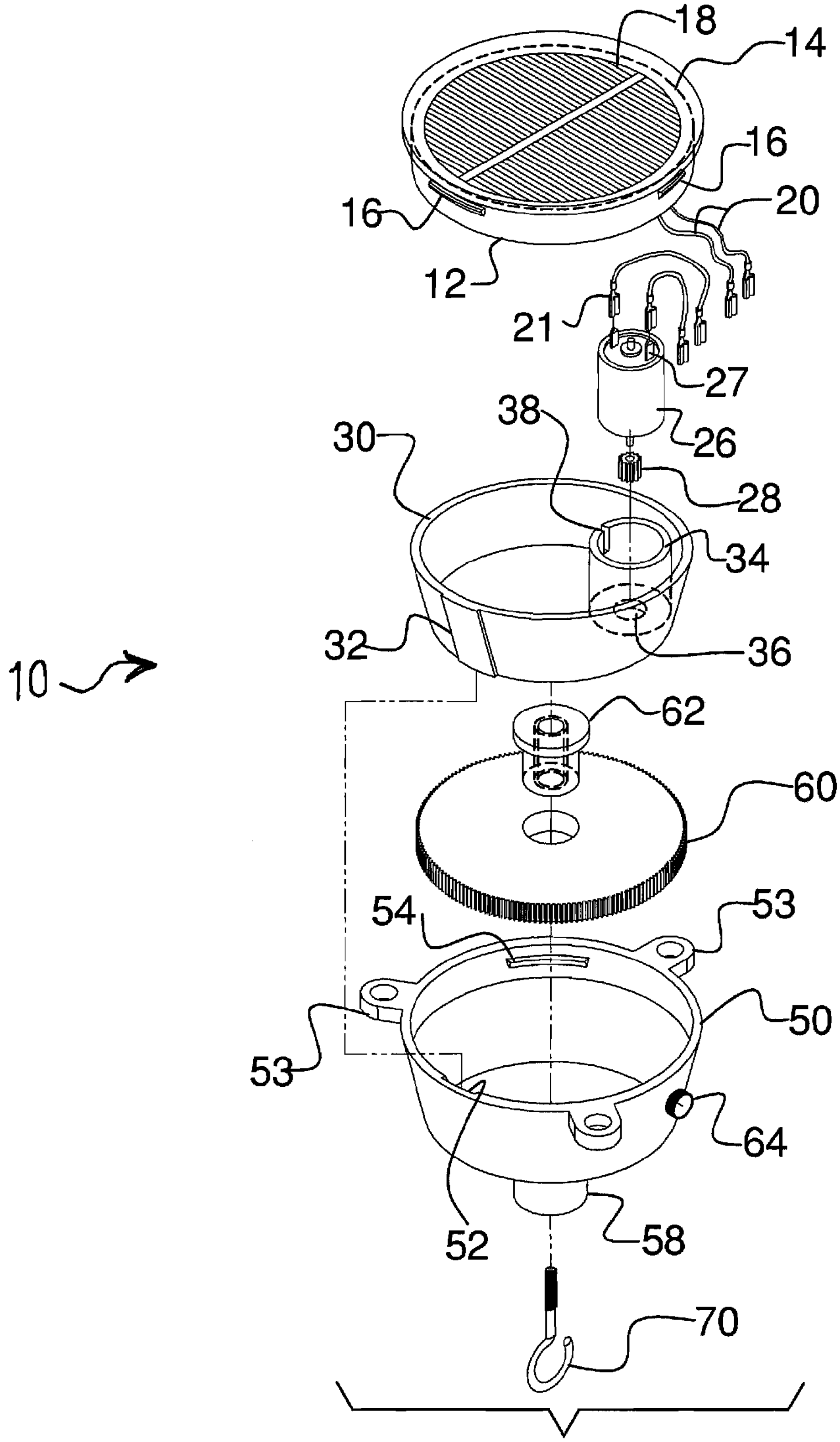
FIG. 5 is an exploded perspective view of the invention.

Referring to FIG. 5, solar powered mobile comprises the invention 10. The mobile comprises a frustum shaped drive housing 30. The drive housing 30 further comprises a vertically disposed key 32 on an outer circumference of a section of the drive housing 30.

A cylindrical motor housing 34 is disposed off-center within the drive housing 30. An outlet 36 is within a bottom of the motor housing 34. A guide slot 38 is within the motor housing 34. A DC motor 26 is removably fitted within the motor housing 34. The motor 26 is connected to the solar sell panel by leads 20. The motor is affixed with male connectors 27. The leads 20 are fitted with female connectors 21. The control 64 for the motor 26 is removably fixed in line with the leads 20. The control 64 fits within the side of the case 50. A guide pin (not shown) is on an exterior of the motor 26. The guide pin fits into the guide slot 38 of the motor housing 34. The guide pin and the guide slot 38 mate to prevent the motor 26 from moving. A pinion gear 28 is driven by the motor 26. The pinion gear 28 exits the outlet 36 of the motor housing 34. A round solar cell housing 12 is removably fitted within the top of the drive housing 30. The round solar cell panel 18 is removably fitted within the top the solar cell housing 12. A clear cover 14 fits atop the solar cell panel 18. A plurality of male detents 16 is disposed within an outer circumference of the solar cell housing 12.

A frustum shaped case 50 of the invention 10 removably receives the drive housing 30. The case 50 is of a size slightly larger than the drive housing 30. A vertically disposed keyway 52 is in an interior side of the case 50. The keyway 52 removably receives of the key 32 of the drive housing 30, whereby the drive housing 30 is stationarily located within the case 50. A plurality of female detents 54 are within an upper inner periphery of the case 50. The female detents 54 removably receive of the male detents 16 of the solar cell housing 12. The case 50 further comprises a bearing sleeve 58 in the center bottom of the case 50. The bearing sleeve 58 contains a bearing orifice 56.

The drive gear 60 inserts within the case 50. The drive gear 60 meshes with the pinion gear 28. A bearing 62 is fixedly inserted within the drive gear 60. The bearing 62 is freely received by the bearing orifice 56 of the bearing sleeve 58, whereby rotation of the pinion gear 28 by the motor 26 turns the bearing 62 and hence the drive gear 60 within the case 50. A spinner 80 is provided for spinning below the case 50. The spinner illustrated is a substantial corkscrew shape. Other devices are provided for spinning in other examples of the invention 10. The fastening means for fastening the spinner 80 to the bearing 62 is threadably received by the bearing 62. The fastening means is a hook 70. Other examples of the invention 10 utilize various fastening means, such as an eyelet, bolt, or the like. A plurality of mounting ears 53 extend outward from the outer circumference of an upper area of the case 50. The invention 10 is thereby available for suspension from a chosen fixture (not shown).

Figure 1:
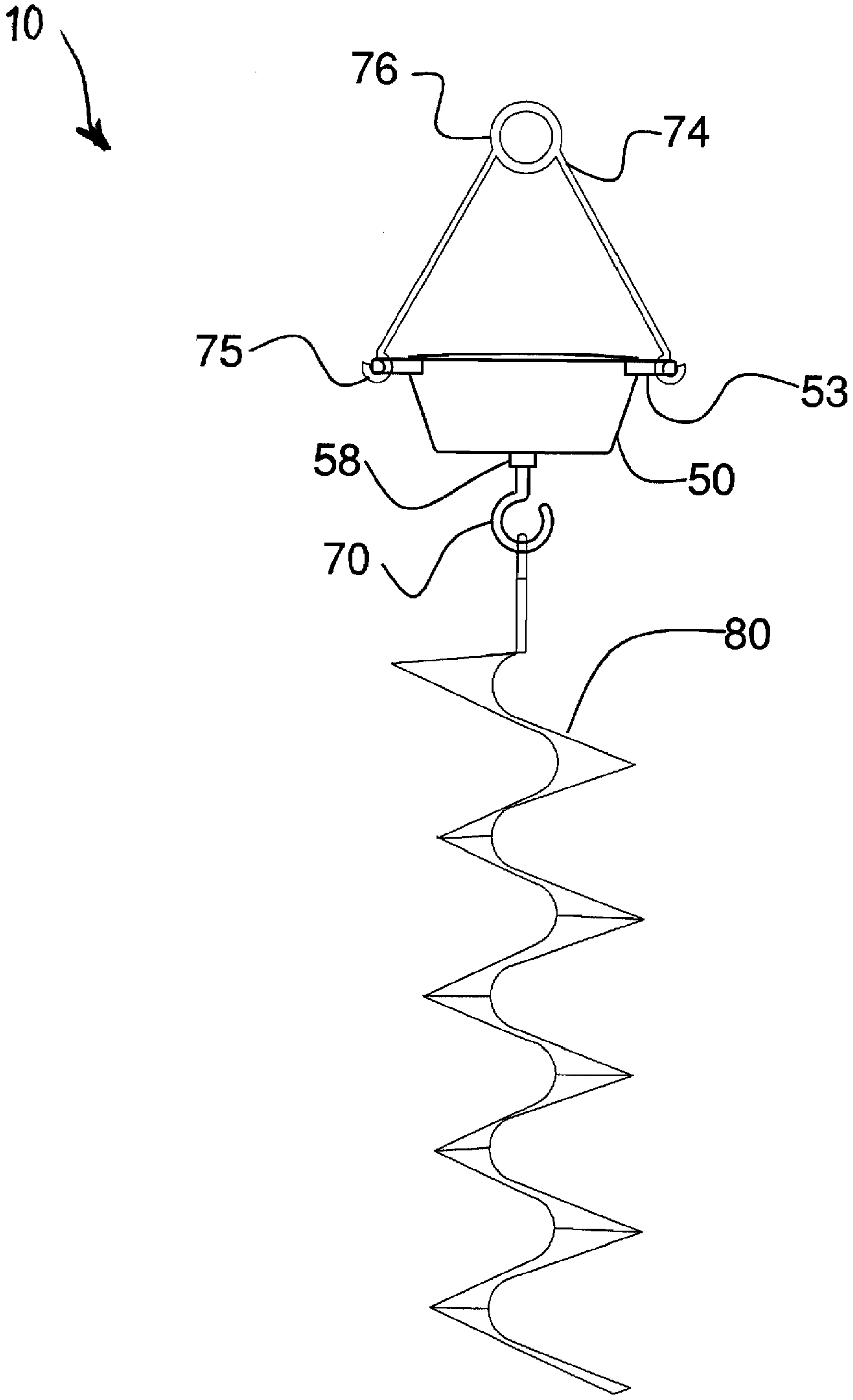
FIG. 1 is a lateral elevation view of the invention.

Referring to FIG. 1, the invention is prepared for hanging from a chosen fixture. A hanger 74 comprises a plurality of hanger hooks 75. The hanger hooks 75 removably connect to the mounting ears 53 of the case 50. The top of the hanger 74 comprises a hanger eyelet 76 for attachment to various fixtures.

Figure 2:
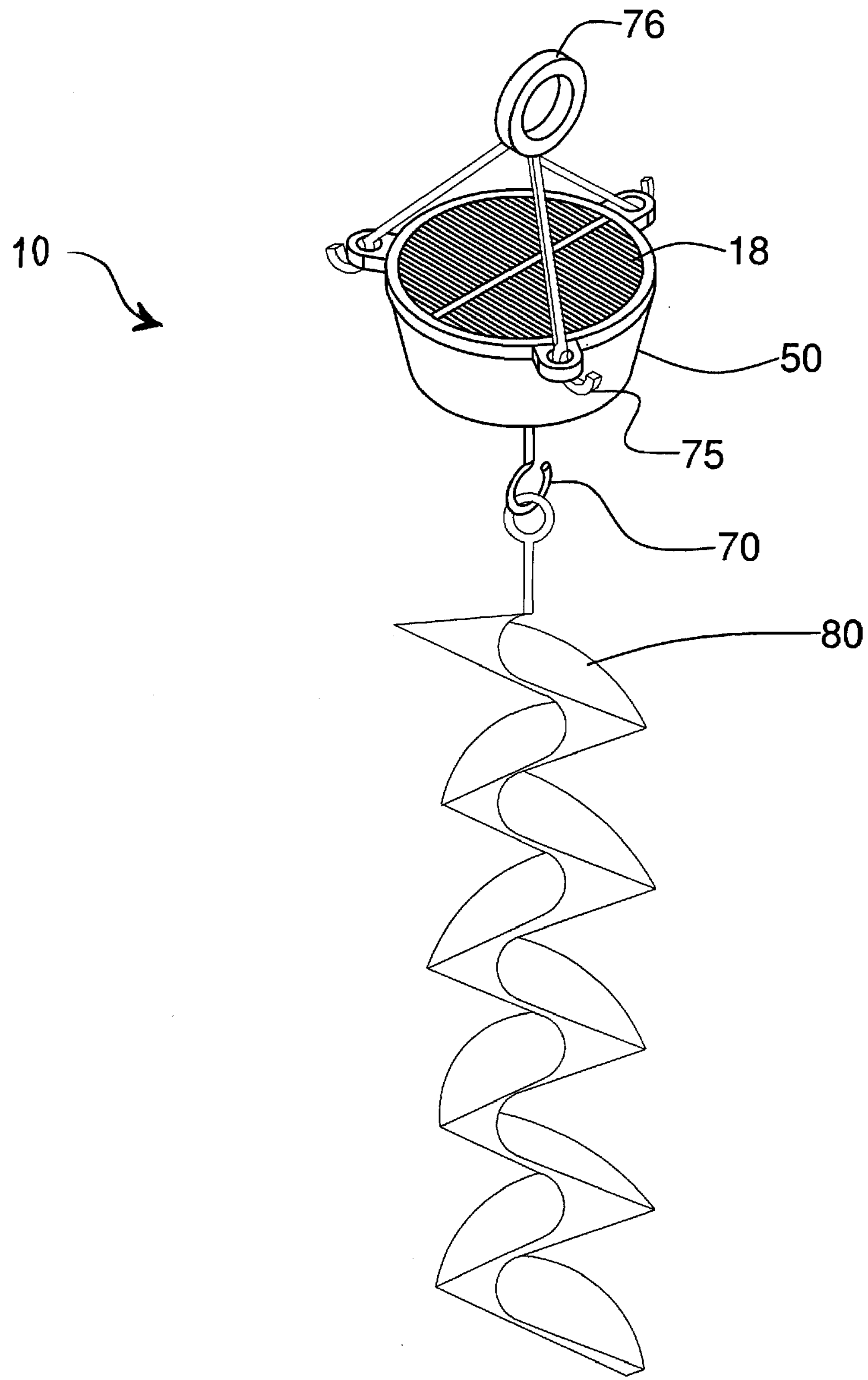
FIG. 2 is a perspective view of the invention.

Referring to FIG. 2, the hanger 74 is a tripod design which does not block solar radiation to the solar cell panel 18.

Figure 3:
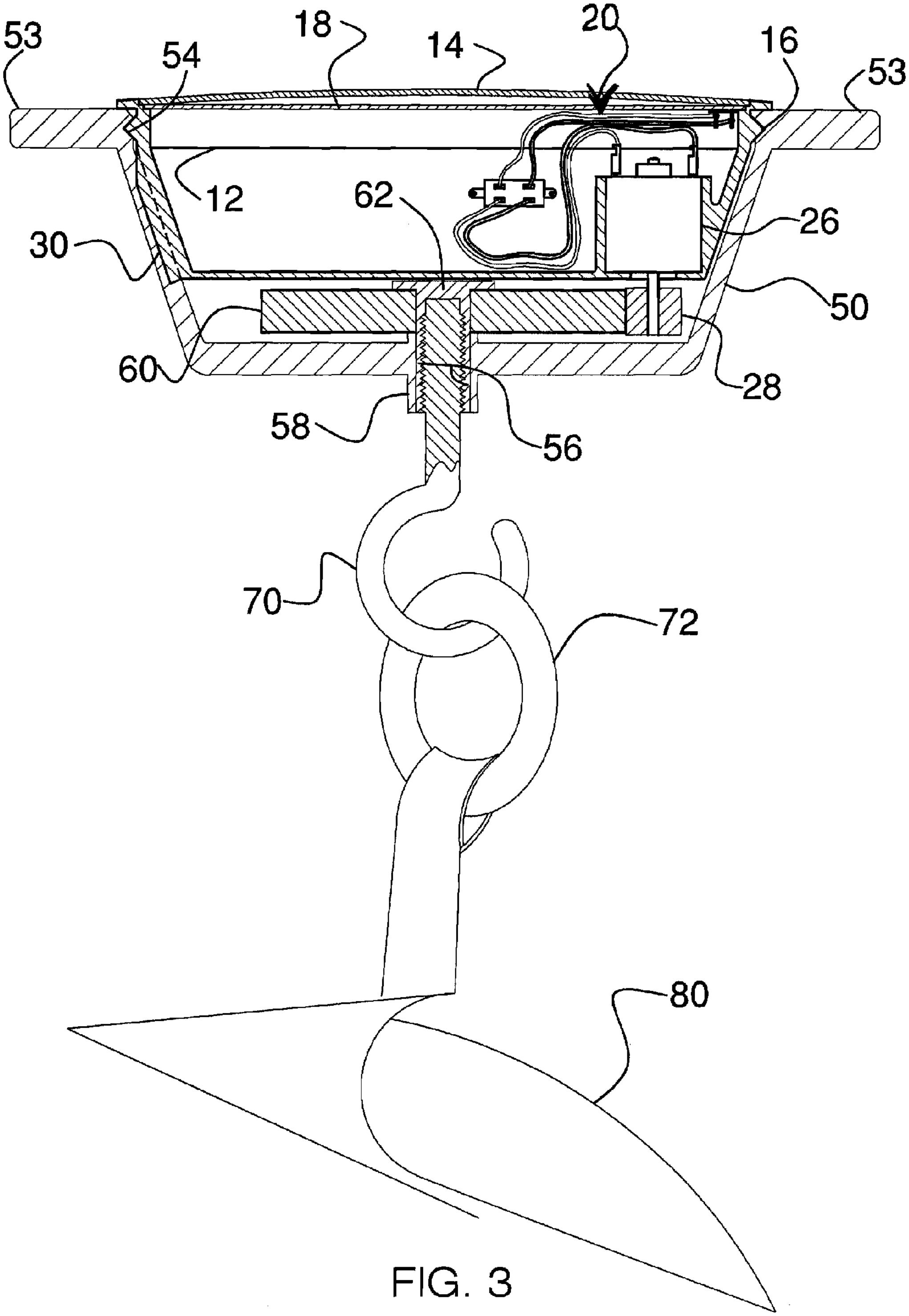
FIG. 3 is cross sectional view of the invention's case and related operational components.

Referring to FIG. 3, the male detents 16 of the drive housing 30 are removably fitted within the female detents 54 of the drive housing 30. The solar cell panel 18 fits within the top of the solar cell housing 12. The clear cover 14 fits atop the solar cell panel 18 within the solar cell housing 12.

The pinion gear 28 is engaged with the drive gear 60. The drive gear 60 is fixedly mated with the bearing 62. The bearing 62 freely turns within the bearing orifice 56 of the bearing sleeve 58 and the case 50. The hook 70 is threaded into the bearing 62. The eyelet 72 of the spinner 80 removably hooks to the hook 72.

Figure 4:
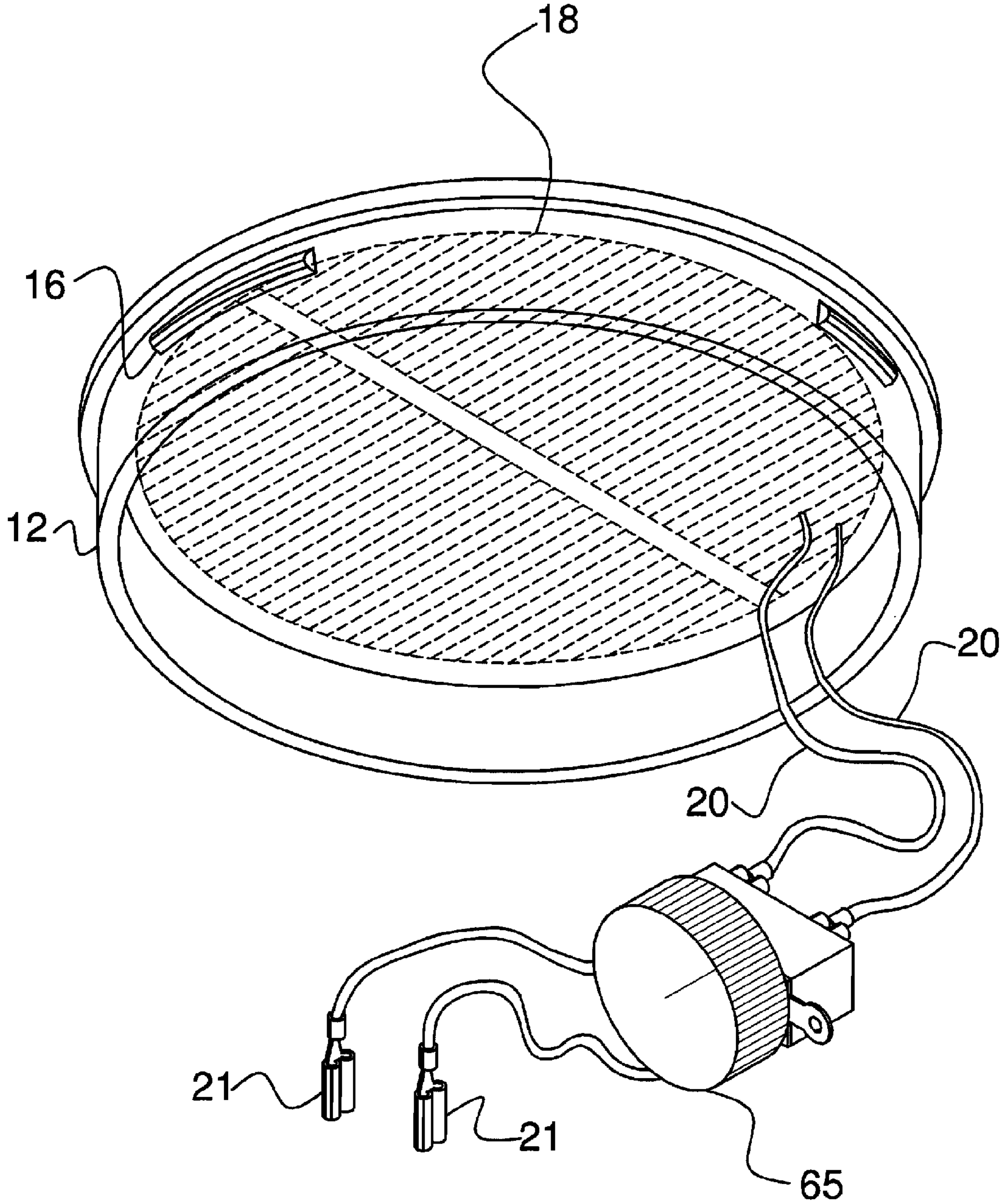
FIG. 4 is a perspective view of the solar cell panel of the invention.

Referring to FIG. 4, the solar cell panel 18 is fitted within the top of the solar cell housing 12. The leads 20 afford removable connection of the control 64. The control 64 provides adjustment of the power input from the solar cell panel 18 to the motor 26, thereby affording adjustable motor 26 speeds.

With respect to the above description then, it is to be realized that the optimum dimensional relationships for the parts of the solar powered mobile, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as “front”, “back”, “in”, “out”, “downward”, “upper”, “lower”, and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A solar powered mobile, the mobile comprising:

a frustum shaped drive housing;

a vertically disposed key on an outer circumference of a section of the drive housing;

a cylindrical motor housing within the drive housing;

an outlet within a bottom of the motor housing;

a guide slot within the motor housing;

a DC motor removably fitted within the motor housing;

a guide pin on an exterior of the motor, the guide pin for fitment into the guide slot of the motor housing;

a pinion gear driven by the motor, the pinion gear exiting the outlet of the motor housing;

an open top of the motor housing, whereby the motor is replaceable;

a round solar cell housing for fit into a top of the drive housing;

a round solar cell panel removably within the solar cell housing;

a clear cover of the solar cell panel;

a plurality of male detents within an outer circumference of the solar cell housing;

a frustum shaped case of the mobile, the case of a size slightly larger than the drive housing, the case for removable receipt of the drive housing;

a vertically disposed keyway in the case, the keyway for removable receipt of the key of the drive housing, whereby the drive housing is specifically located within the case;

a plurality of female detents within an upper inner periphery of the case, the female detents for removable receipt of the male detents of the solar cell housing;

a bearing sleeve in a center bottom of the case;

a bearing orifice in the sleeve;

a drive gear for rotatable insertion within the case, the drive gear meshing with the pinion gear;

a bearing inserted within the drive gear, the bearing freely received by the bearing orifice of the bearing sleeve, whereby rotation of the pinion gear by the motor turns the bearing and hence the drive gear within the case;

an object for spinning below the case;

fastening means for fastening the object to the bearing whereby the object is spun;

a plurality of mounting ears extended outward from the outer circumference of an upper area of the case, whereby the case all related components are available for suspension from a chosen fixture.

2. The invention in claim 1 wherein the fastening means for fastening an object to the bearing is an eyelet.

3. The invention in claim 2 wherein the fastening means for fastening an object to the bearing is a hook.

4. The invention in claim 3 wherein the object to be spun is a spinner.

5. The invention in claim 4 wherein the object to be spun is a substantially corkscrew shaped spinner.

6. The invention in claim 5 wherein the motor is further controlled by a power adjustment device, the device providing power input from the solar cell panel to the motor, whereby the motor speed is adjustable.

* * * * *